(12) United States Patent
Frashure

(10) Patent No.: US 9,128,354 B2
(45) Date of Patent: Sep. 8, 2015

(54) DRIVER VIEW ADAPTER FOR FORWARD LOOKING CAMERA

(71) Applicant: Timothy J. Frashure, Columbia Station, OH (US)

(72) Inventor: Timothy J. Frashure, Columbia Station, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 336 days.

(21) Appl. No.: 13/688,515

(22) Filed: Nov. 29, 2012

(65) Prior Publication Data

US 2014/0146152 A1    May 29, 2014

(51) Int. Cl.
*H04N 5/77* (2006.01)
*G03B 15/00* (2006.01)
*H04N 5/247* (2006.01)
*H04N 7/18* (2006.01)
*G03B 17/17* (2006.01)

(52) U.S. Cl.
CPC ............... *G03B 15/00* (2013.01); *G03B 17/17* (2013.01); *H04N 5/247* (2013.01); *H04N 7/188* (2013.01)

(58) Field of Classification Search
None
See application file for complete search history.

(56) References Cited

U.S. PATENT DOCUMENTS

| 5,414,461 | A | 5/1995 | Kishi et al. |
| 5,568,211 | A | 10/1996 | Bamford |
| 6,400,835 | B1 | 6/2002 | Lemelson et al. |
| 6,738,088 | B1 | 5/2004 | Uskolovsky et al. |
| 6,850,827 | B1 | 2/2005 | Morris, Sr. |
| 6,920,234 | B1 | 7/2005 | Koenig et al. |
| 6,935,758 | B2 | 8/2005 | Plaster |
| 7,344,258 | B2 | 3/2008 | MacDougall |
| 7,592,592 | B2 | 9/2009 | Eriksson |
| 7,602,947 | B1 | 10/2009 | Lemelson et al. |
| 2004/0032493 | A1 | 2/2004 | Franke et al. |
| 2004/0218042 | A1 | 11/2004 | Kanada et al. |
| 2004/0233277 | A1 | 11/2004 | Miller et al. |
| 2005/0001901 | A1 | 1/2005 | Eggers et al. |
| 2007/0176083 | A1 | 8/2007 | Wimmer et al. |
| 2008/0143834 | A1* | 6/2008 | Comeau et al. ............... 348/148 |
| 2008/0158357 | A1* | 7/2008 | Connell et al. ............... 348/148 |
| 2008/0304705 | A1* | 12/2008 | Pomerleau et al. ........... 382/103 |
| 2009/0136141 | A1* | 5/2009 | Badawy et al. ............... 382/225 |

(Continued)

FOREIGN PATENT DOCUMENTS

| DE | 10031590 A1 | 1/2002 |
| GB | 2327823 A | 3/1999 |
| WO | WO 02/095757 A2 | 11/2002 |

OTHER PUBLICATIONS

International Search Report and Written Opinion of corresponding International Application No. PCT/US2013/067698, dated Jan. 30, 2014, 11 pages.

*Primary Examiner* — William C Vaughn, Jr.
*Assistant Examiner* — Eileen Adams
(74) *Attorney, Agent, or Firm* — Fay Sharpe LLP

(57) ABSTRACT

When monitoring the forward area in front of a vehicle, video of the forward area and the driver of the vehicle is concurrently captured by a single forward facing camera with a rearward facing mirror assembly reflects an image of the driver, who is positioned behind the forward facing camera, into the forward facing field of view of the camera. The mirror assembly is positioned in an inactive portion of the field of view of the camera so that the reflected image of the driver appears in the inactive portion of the field of view in the captured video. In this manner, synchronized video of the forward area in the driver is generated without requiring computationally expensive post processing.

20 Claims, 4 Drawing Sheets

(56) References Cited

U.S. PATENT DOCUMENTS

| | | | |
|---|---|---|---|
| 2009/0244288 A1* | 10/2009 | Fujimoto et al. | 348/164 |
| 2010/0020170 A1 | 1/2010 | Higgins-Luthman et al. | |
| 2011/0084820 A1 | 4/2011 | Walter et al. | |
| 2011/0122520 A1 | 5/2011 | Verheyden | |
| 2011/0234798 A1 | 9/2011 | Chou | |
| 2012/0268311 A1 | 10/2012 | Lynam | |

* cited by examiner

DRIVER VIEW ADAPTER FOR FORWARD LOOKING CAMERA

BACKGROUND

The present application finds particular application in vehicular camera systems, particularly involving video monitoring systems. However, it will be appreciated that the described technique may also find application in other camera systems, other vehicle monitoring systems, or other driver monitoring systems.

One conventional camera system relates to a camera mounted on the windshield of a vehicle and alternately captures the vehicle interior view with the vehicle exterior view. The camera includes two different optical openings, one forward facing and the other rear-facing. The driver's eyes are monitored to determine if the driver is awake between video capture times. An automatically positionable mirror is controlled to ensure that the driver remains in the view of the camera at all times. The exterior image and interior image are taken at two separate times and processed independently. Such systems do not provide for simultaneous capture video of both the area in front of the vehicle and the driver.

Another conventional camera system is directed to an automatically positionable mirror. The camera is mounted in the position of the rearview mirror to capture the front of the vehicle and rear interior views. A controller coordinates the movement of the mirror with the data capture device so that at least two images are interlaced in a single video frame. The video is used for lane tracking, driver eye tracking and occupant detection. However such conventional systems do not simultaneously capture the driver's reflected image in the forward area field of view in a manner that causes video of the driver to be inset in the video of the forward area field of view, let alone in an inactive portion of the field of view of the camera.

The present innovation provides new and improved systems and methods that facilitate concurrently monitoring a driver of a vehicle and an area in front of the vehicle using a single forward facing camera to generate synchronized video of the driver in the area in front of the vehicle, which overcome the above-referenced problems and others.

SUMMARY

In accordance with one aspect, a camera unit that facilitates concurrently monitoring a driver of a vehicle and an area in front of the vehicle comprises a forward-looking camera that monitors the area in front of a vehicle on which the camera is mounted, and a rearward-facing mirror assembly coupled to the camera, wherein the mirror assembly is within a field of view of the camera and reflects an image of the driver into the camera. The camera is facing a first direction and the mirror is facing a second direction. In one example, the second direction is approximately 180 degrees different from the first direction.

In accordance with another aspect, a method of concurrently capturing video of a driver of a vehicle and an area in front of the vehicle via a single forward-facing camera comprises monitoring an area in front of a vehicle on which the camera is mounted. The method further comprises concurrently capturing video of the area in front of the vehicle and of the driver of the vehicle via a rearward-facing mirror assembly positioned within a field of view of the camera and which reflects an image of the driver into the camera. The camera is positioned in front of and facing away from a driver's seat.

According to another aspect, a vehicular video recording system that facilitates concurrently monitoring a driver of a vehicle and an area in front of the vehicle comprises a forward-looking camera that monitors the area in front of a vehicle on which the camera is mounted, and a rearward-facing mirror assembly coupled to the camera, wherein the mirror assembly is within a field of view of the camera and reflects an image of the driver into the camera.

In accordance with another aspect, an apparatus for concurrently capturing video of a driver of a vehicle and an area in front of the vehicle via a single forward-facing camera comprises monitoring means for monitoring an area in front of a vehicle on which the monitoring means is mounted, and reflecting means for reflecting an image of the driver into the monitoring means and positioned within a field of view of the monitoring means. The apparatus further comprises processing means for detecting a trigger event that causes the camera to begin recording video for a predetermined time period. The monitoring means concurrently captures video of the area in front of the vehicle and of the driver of the vehicle via the reflecting means. Additionally, the monitoring means is forward-facing and is positioned in front of a driver's seat.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described vehicle camera assembly, which includes a rear facing mirror. In one embodiment, the forward looking camera is located in the cab of the vehicle, in the upper windshield portion, and focused on the area in front of the vehicle. The camera is used in conjunction with a safety system controller to identify potential driving hazards in and around the road in front of the vehicle. The addition of the rear facing mirror to the field of view of the forward facing camera facilitates capturing video of the driver at the same time the forward video information is gathered, thereby ensuring simultaneous video of the driver and forward area. According to various aspects described herein, the mirror is mounted inside the camera assembly or outside the camera but close to the optical opening. The optics of the mirror can be manually, automatically, or semi-automatically adjustable to obtain a correct focal length and field of view to capture the focused image of the driver of the camera is focused on the forward area.

Figure 1:
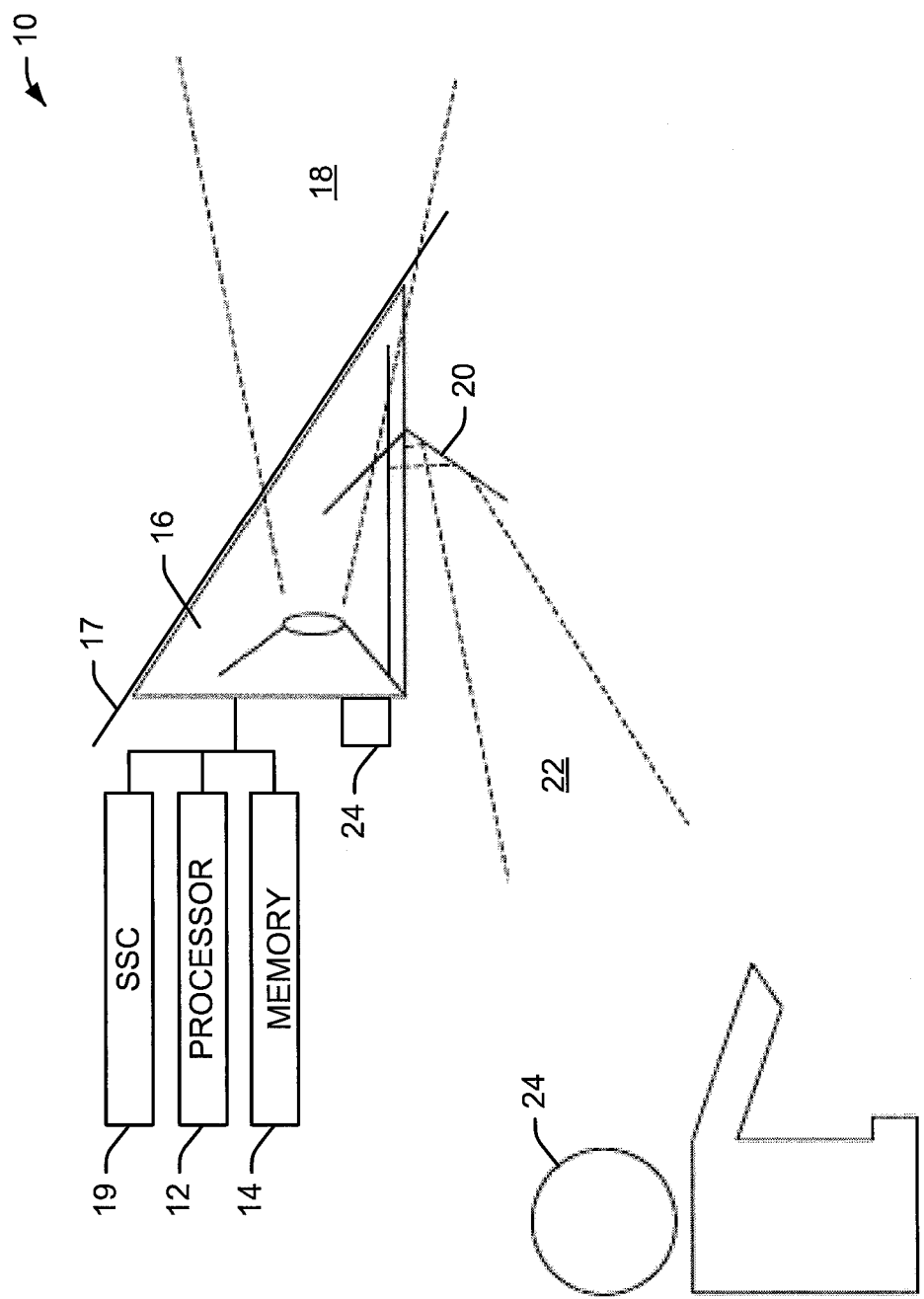
FIG. 1 illustrates a vehicular video recording system that facilitates concurrently monitoring a driver of a vehicle and an area in front of the vehicle using a single forward facing camera.

FIG. 1 illustrates a vehicular video recording system 10 that facilitates concurrently monitoring a driver of a vehicle and an area in front of the vehicle using a single forward facing camera. The system 10 includes a processor 12 that executes, and a memory 14 that stores, computer-executable instructions (e.g., modules, routines, programs, applications, etc.) for performing the various methods, techniques protocols, etc., described herein. The memory 14 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 12. Additionally, "module," as used herein denotes a set of computer-executable instructions (e.g., a routine, sub-routine, program, application, or the like) that is persistently stored on the computer-readable medium or memory for execution by the processor.

A forward facing camera 16 is coupled to the processor and memory and mounted to the vehicle (not shown). In one embodiment the camera is mounted to a windshield 17 of the vehicle. The camera has a forward facing field of view 18 that is directed out through the windshield in order to monitor an area in front of the vehicle in which the camera is mounted. In one embodiment, the camera detects a trigger event such as a rapidly approaching forward vehicle, an unpredicted lane change (e.g. the vehicle veers onto the shoulder of the road upon which it is traveling), etc. In another embodiment, the processor receives an indication of a trigger event, e.g., from a safety system controller (SSC) 19 (e.g., which coordinates one or more vehicle safety systems such as a collision mitigation system, an adaptive cruise control system, an electronic stability program system, an antilock brake system, etc.) such as a rapidly approaching forward vehicle, and unpredicted lane change, a rapid deceleration of the host vehicle, or the like. Upon detection of a trigger event, the camera 16 begins recording video of the area in front of the vehicle for a predetermined time (e.g., 30 seconds, 60 seconds, 5 min., 30 min., or some other predetermined time period). In one embodiment, video is recorded periodically or continuously so that there is recent video (e.g. the previous 5 min., previous 10 min., etc.) available upon detection of a trigger event. Upon detection of the trigger event, the recent video is permanently stored to memory 14 in addition to video of the trigger event and post-trigger event video data. According to another embodiment, the camera system is activated periodically (e.g., every 30 seconds, once a minute, once every 5 min., etc.) for a predetermined time period in order to monitor the driver and the area in front of the vehicle. Captured video preceding an alert condition or event (e.g. a collision, near collision, or the like) can subsequently be analyzed to determine driver state prior to and during a particular condition or event. In another embodiment, the camera records video until it is manually deactivated (e.g. in the case of collision mitigation, where an impact is detected, etc.). Recorded video is stored in the memory 14, for subsequent analysis.

According to one example, a video controller (e.g. the processor 12) and the safety system controller 19 are separate units. In another example video control and safety system control are performed by a single controller.

Coupled to the camera is a mirror assembly 20 that is positioned within the field of view 18 of the camera and faces the driver, such that the field of view 22 of the mirror assembly reflects an image of the driver back into the camera. In one example, the mirror assembly is positioned with a view approximately 180 degrees different from the forward facing camera view. In one embodiment, the mirror assembly 20 is positioned within an "inactive" portion of the field of view 18. The inactive portion of the field of view includes one or more regions that do not include forward elements (e.g. vehicles or the like) that are of interest during video processing. The inactive portion of the field of view can be identified by the camera after installation or can be preset by the manufacturer or installer of the camera system. For example, a portion of the field of view 18 occupied by a hood (not shown) of the vehicle is considered "inactive" because this portion of the field of view is not monitoring of the forward area in front of the vehicle. Other inactive portions of the field of view may include the sky or the sides of the road where the view is trees or field, or any area where no vehicle activity is detected. In this regard, an "active" region of the field of view comprises all regions thereof that are not inactive, such as a traffic zone in front of the vehicle. In one embodiment, the inactive portion is located at the top or bottom of the field of view and occupies, e.g., 25% thereof or less. Positioning the mirror assembly in the inactive portion of the field of view facilitates reflecting an image of the driver, who is positioned behind the forward facing camera, without impeding forward monitoring by the camera.

In one embodiment, the system includes an illumination source 24 that is activated when the camera begins to record and stays on for the predetermined time period to illuminate the driver's face during recording. In another embodiment, the illumination source is on whenever the vehicle is running or whenever the key is in the ignition. The illumination source may be an infrared light source, a near infrared light source, or some other suitable light source that illuminates the driver's face without distracting the driver otherwise impeding his view through the windshield. In another embodiment, the illumination source is a light emitting diode.

During installation of the system 10, the camera can be activated to record video of the forward area in front of the vehicle of the vehicle is in motion (e.g., driven in a parking lot or the like). Video footage captured by the camera can be analyzed by the installer to identify an inactive portion of the field of view of the camera (e.g. the hood of the vehicle). In another embodiment, the processor 12 analyzes the captured video and identifies the inactive portion of the field of view 18, e.g. by recognizing and pixels in the inactive portion do not change between frames of captured video (e.g., because the hood is stationary) as opposed to the usable portion of the field of view wherein pixel values change between frames. Once the inactive portion of the field of use identified, the installer mounts or deploys the mirror assembly to the camera (or to the windshield or other part of the vehicle) in a position within the inactive portion of the field of view and causes the driver's image to be reflected in the camera. The installer can then verify accurate positioning of the mirror assembly by driving the vehicle while capturing video, and reviewing the video captured with the mirror assembly attached. The installer can adjust the mirror assembly appropriately to ensure that it is positioned within the inactive portion of the field of view 18 and that the mirror assembly field of view 22 includes an unimpeded view of the driver's face.

Figure 2:
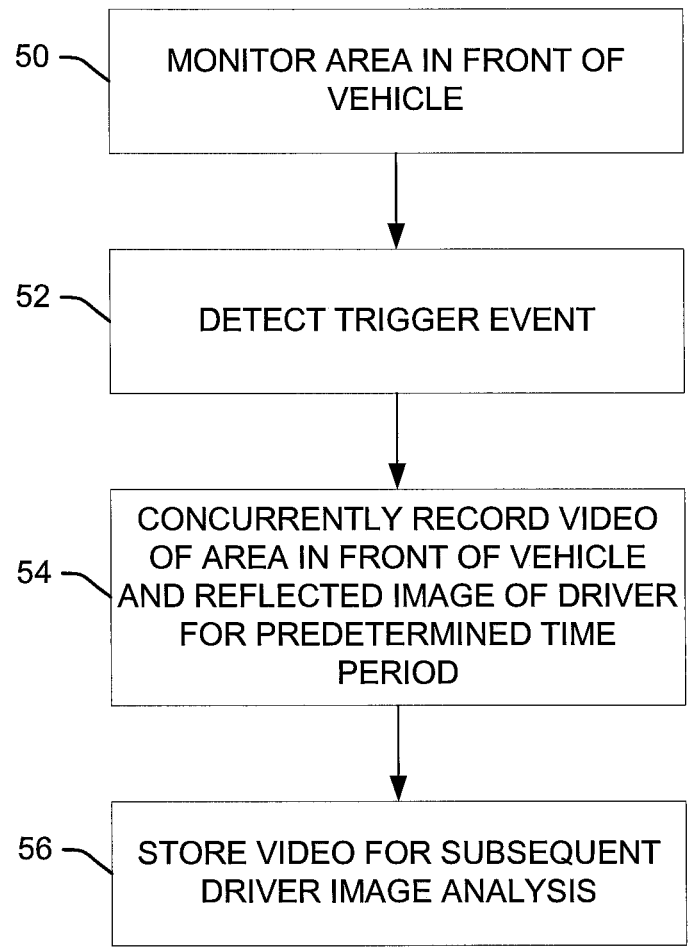
FIG. 2 illustrates a method of concurrently capturing video of the driver of the vehicle and an area in front of the vehicle by a single forward facing camera.

FIG. 2 illustrates a method of concurrently capturing video of the driver of the vehicle and an area in front of the vehicle by a single forward facing camera. At 50, an area is monitored in front of vehicle on which the camera is mounted. At 52, trigger event is detected that causes the camera to begin recording video for a predetermined time period (e.g., 30 seconds, 1 min., 5 min., or some other predetermined time period). According to one embodiment, the camera continuously records data and stores it in a buffer for a predetermined time, after which it is deleted if no trigger event is detected within the predetermined time. If a trigger event is detected, then the predetermined time (e.g., 1 minute, 3 minutes, 5 minutes, etc.) of data is stored to memory for subsequent review. At 54, video is concurrently captured of the area in front of the vehicle and the driver of the vehicle via a rearward facing mirror assembly positioned within the field of view of the camera. That is, by positioning the rearward facing mirror assembly in the field of view of the forward facing camera, video of the driver of the vehicle can be captured even though the driver is positioned behind the forward facing camera. In this manner, the driver's reaction to the trigger event can be captured along with video of the area in front of the vehicle. At 56, captured video of the driver and the area in front of the vehicle is stored to memory for subsequent analysis.

From the camera's perspective, the mirror assembly is positioned such that the reflected driver's image is overlaid on the captured video in an "inactive" portion of the field of view of the forward facing camera. For example, the forward facing camera captures video that includes the area in front of the vehicle including the hood of the vehicle. Because the hood of the vehicle impedes the camera's view of the area in front of the vehicle, the portion of the camera's field of view that includes the hood is considered to be "inactive." Accordingly, the mirror assembly is coupled to the camera (or other structure in the vehicle) so that it reflects the driver's image into the camera while still being positioned in the inactive portion of the camera's field of view. The resulting captured video includes the reflected driver's image overlaid on the inactive portion of the field of view of the camera.

According to another feature, a rearward facing illumination source is activated concurrently with the camera, to illuminate the driver's face in the lighting conditions. The illumination source may be an infrared light source, a near infrared light source, or some other suitable light source that illuminates the driver's face without distracting the driver otherwise impeding his view through the windshield. In another embodiment, the illumination source is a light emitting diode.

Figure 3:
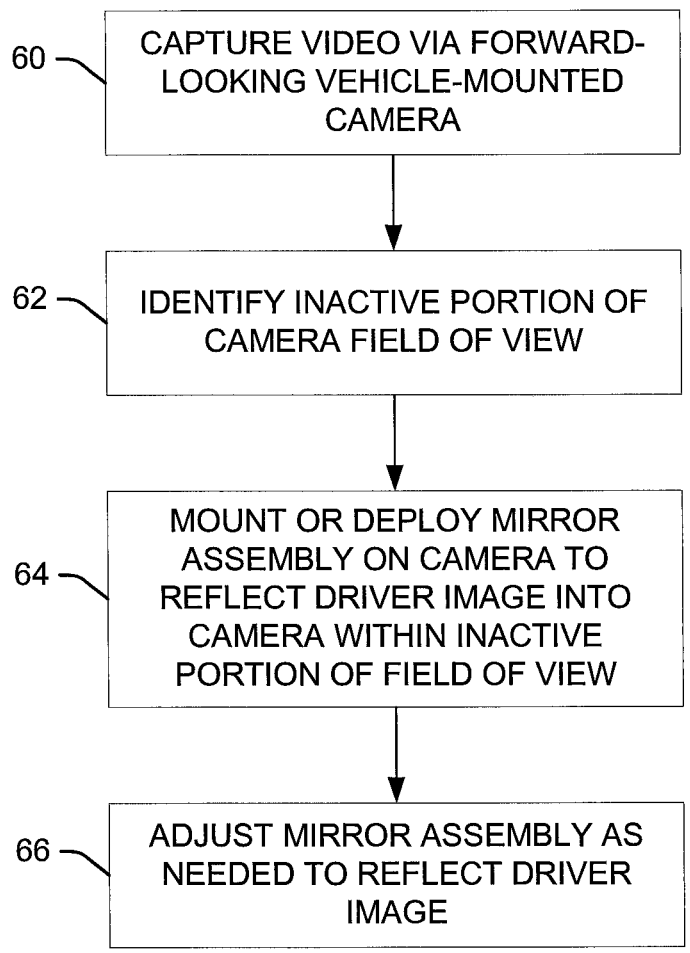
FIG. 3 illustrates a method for installing and/or calibrating a forward-looking vehicle mounted camera to concurrently capture video of the forward area in front of the vehicle and driver of the vehicle positioned behind the forward looking camera.

FIG. 3 illustrates a method for installing and/or calibrating a forward-looking vehicle mounted camera to concurrently capture video of the forward area in front of the vehicle and driver of the vehicle positioned behind the forward looking camera. At 60 video is captured by the forward-looking vehicle mounted camera. At 62, an inactive portion of the field of view of the camera is identified. In one example, the forward facing camera captures video that includes the area in front of the vehicle including the hood of the vehicle, which impedes the camera's view of the area in front of the vehicle. Accordingly, the portion of the camera's field of view that includes the hood or other obstruction or stationary structure is considered to be "inactive" for monitoring events that occur in front of the vehicle. A processor or the like analyzes the captured video and identifies the inactive portion of the field of view by identifying pixels the do not change or change little between frames relative to pixels in the usable portion of the field of view, whose values change more dramatically from frame to frame. In another example the inactive portion of the field of view is manually identified by the installer of the camera system.

At 64, mirror assembly is mounted or deployed on the camera or other structure in the vehicle in such a position as to reflect the driver image into the camera so that the driver's image appears in the captured video in the inactive portion of the field of view of the camera. That is, the mirror assembly is mounted in a position that does not obstruct the usable portion of the field of view of the camera. At 66, mirror assembly is adjusted as needed to reflect the driver's image accurately. If desired, additional video can be captured by the camera to verify that the mirror assembly is positioned so that it does not obstruct the usable portion of the field of view of the camera while accurately reflecting the driver's image into the camera.

Figure 4:
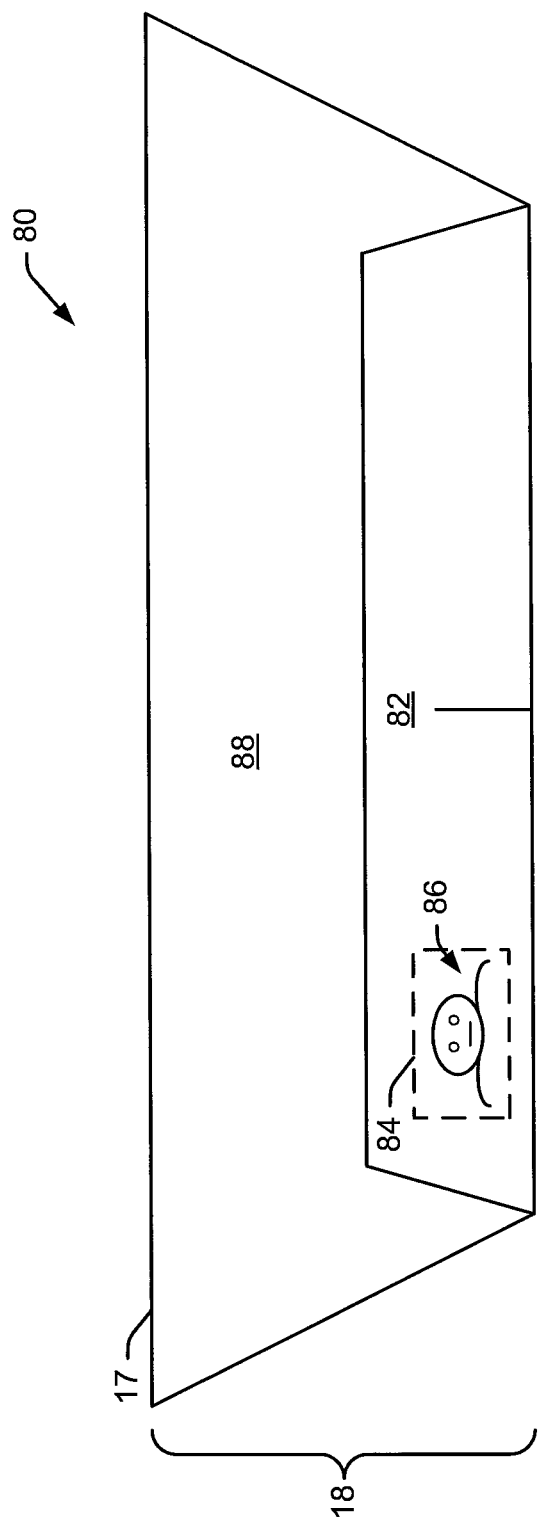
FIG. 4 is an illustration of the video frame such as is captured by the herein described camera system and concurrently capturing video of the driver in the area in front of the vehicle.

FIG. 4 is an illustration of a video frame 80 such as is captured by the herein described camera system when concurrently capturing video of the driver and the area in front of the vehicle. The video frame represents a captured field of view 18, which may be as large as the windshield 17 or may be smaller than the driver's view through the windshield. Within the camera field of view 18 is an inactive portion 82 of the field of view, which, in FIG. 4, is occupied by the hood of the vehicle in which the camera system is employed. Overlaid on the inactive portion 82 of the field of view 18 is reflected video 84 of the driver 86 of the vehicle. By positioning the mirror assembly of the preceding figures such that it reflects an image of the driver without impeding the usable portion 88 of the camera field of view 18, synchronized video of the area in front of the vehicle and of the driver of the vehicle is captured without requiring computationally expensive post-processing. In this manner, the described systems and methods provide an efficient and computationally cost-effective solution for monitoring the area in front of the vehicle detection of a trigger event as well as the driver's reaction to the trigger event and/or periodically during the time period preceding the trigger event.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A camera unit that facilitates concurrently monitoring a driver of a vehicle and an area in front of the vehicle, comprising:
   a forward-looking camera that monitors the area in front of a vehicle on which the camera is mounted;
   a rearward-facing mirror assembly coupled to the camera, wherein the mirror assembly is within a field of view of the camera and reflects an image of the driver into the camera;
   wherein the camera is facing a first direction and the mirror is facing a second direction;
   wherein the mirror assembly is positioned within an inactive portion of the field of view of the camera such that the mirror assembly does not impede video processing of forward elements in front of the vehicle.

2. The camera unit according to claim 1, wherein the inactive portion of the field of view occupies less than approximately a lower 25% of the field of view.

3. The camera unit according to claim 1, further comprising a rearward facing illumination source that illuminates the driver and is coupled to the camera unit.

4. The camera unit according to claim 3, wherein the illumination source is an infrared light emitting diode.

5. The camera unit according to claim 1, further comprising a processor configured to:
   analyze video frames captured by the camera;
   identify an inactive portion of the field of view of the camera by identifying an image region that does not change across a predefined number of video frames.

6. The camera unit according to claim 1, wherein the mirror assembly is adjustable for positioning within inactive portion of the field of view of the camera.

7. The camera unit according to claim 1, further comprising a processor configured to:
   detect a trigger event; and
   upon detecting the trigger event, at least one of:
   cause the camera to concurrently record the area in front of the vehicle and the reflected image of the driver; and
   store to memory buffered data recorded for a predetermined time period before the trigger event.

8. The camera unit according to claim 7, wherein the trigger event is a detected deceleration of the vehicle, wherein the detected deceleration is greater than a predetermined deceleration threshold.

9. A method of concurrently capturing video of a driver of a vehicle and an area in front of the vehicle via a single forward-facing camera, comprising:
   monitoring an area in front of a vehicle on which the camera is mounted;
   concurrently capturing video of the area in front of the vehicle and of the driver of the vehicle via a rearward-facing mirror assembly positioned within a field of view of the camera and which reflects an image of the driver into the camera;
   wherein the camera is positioned in front of and facing away from a driver's seat;
   wherein the mirror assembly is positioned within an inactive portion of the field of view of the camera such that the mirror assembly does not impede a forward camera view in front of the vehicle.

10. The method according to claim 9, wherein the inactive portion of the field of view occupies approximately a top or bottom 25 % of the field of view.

11. The method according to claim 9, further comprising activating a rearward facing illumination source that illuminates the driver during a predetermined time period.

12. The method according to claim 9, further comprising:
    during a setup phase, analyzing video frames captured by the camera;
    identifying an inactive portion of the field of view of the camera by identifying an image region that does not change across a predefined number of video frames;
    wherein the mirror assembly is adjustable for positioning within inactive portion of the field of view of the camera.

13. The method according to claim 9, further comprising:
    recording video via the camera prior to a trigger event;
    detecting a trigger event;
    upon detecting the trigger event, at least one of:
    causing the camera to concurrently record the area in front of the vehicle and the reflected image of the driver; and
    storing to memory buffered data recorded for a predetermined time period before the trigger event.

14. The method according to claim 9, wherein the trigger event is a detected deceleration of the vehicle, wherein the detected deceleration is greater than a predetermined deceleration threshold.

15. The method according to claim 9, further comprising:
    detecting a trigger event that causes the camera to begin recording video for a predetermined time period.

16. A vehicular video recording system that facilitates concurrently monitoring a driver of a vehicle and an area in front of the vehicle, comprising:
    a forward-looking camera that monitors the area in front of a vehicle on which the camera is mounted; and
    a rearward-facing mirror assembly coupled to the camera, wherein the mirror assembly is within a field of view of the camera and reflects an image of the driver into the camera;
    wherein the mirror assembly is manually adjustable for positioning within inactive portion of the field of view of the camera.

17. The system according to claim 16, further comprising a processor configured to:
    detect a trigger event; and
    upon detecting the trigger event, at least one of:
    cause the camera to concurrently record the area in front of the vehicle and the reflected image of the driver; and
    store to memory buffered data recorded for a predetermined time period before the trigger event.

18. The system according to claim 16, further comprising a rearward facing illumination source that illuminates the driver and is coupled to the camera unit.

19. The system according to claim 16, wherein the trigger event is a detected deceleration of the vehicle, wherein the detected deceleration is greater than a predetermined deceleration threshold.

20. An apparatus for concurrently capturing video of a driver of a vehicle and an area in front of the vehicle via a single forward-facing camera, comprising:
    monitoring means for monitoring an area in front of a vehicle on which the monitoring means is mounted;
    reflecting means for reflecting an image of the driver into the monitoring means and positioned within a field of view of the monitoring means;
    processing means for detecting a trigger event that causes the monitoring means to at least one of:
    begin recording video for a predetermined time period; and
    store to memory buffered data recorded for a predetermined time period before the trigger event;
    wherein the monitoring means concurrently captures video of the area in front of the vehicle and of the driver of the vehicle via the reflecting means;
    wherein the monitoring means is forward-facing and is positioned in front of a driver's seat; and
    wherein the reflecting means is positioned within inactive portion of the field of view of the monitoring means.

* * * * *